United States Patent Office 3,472,750
Patented Oct. 14, 1969

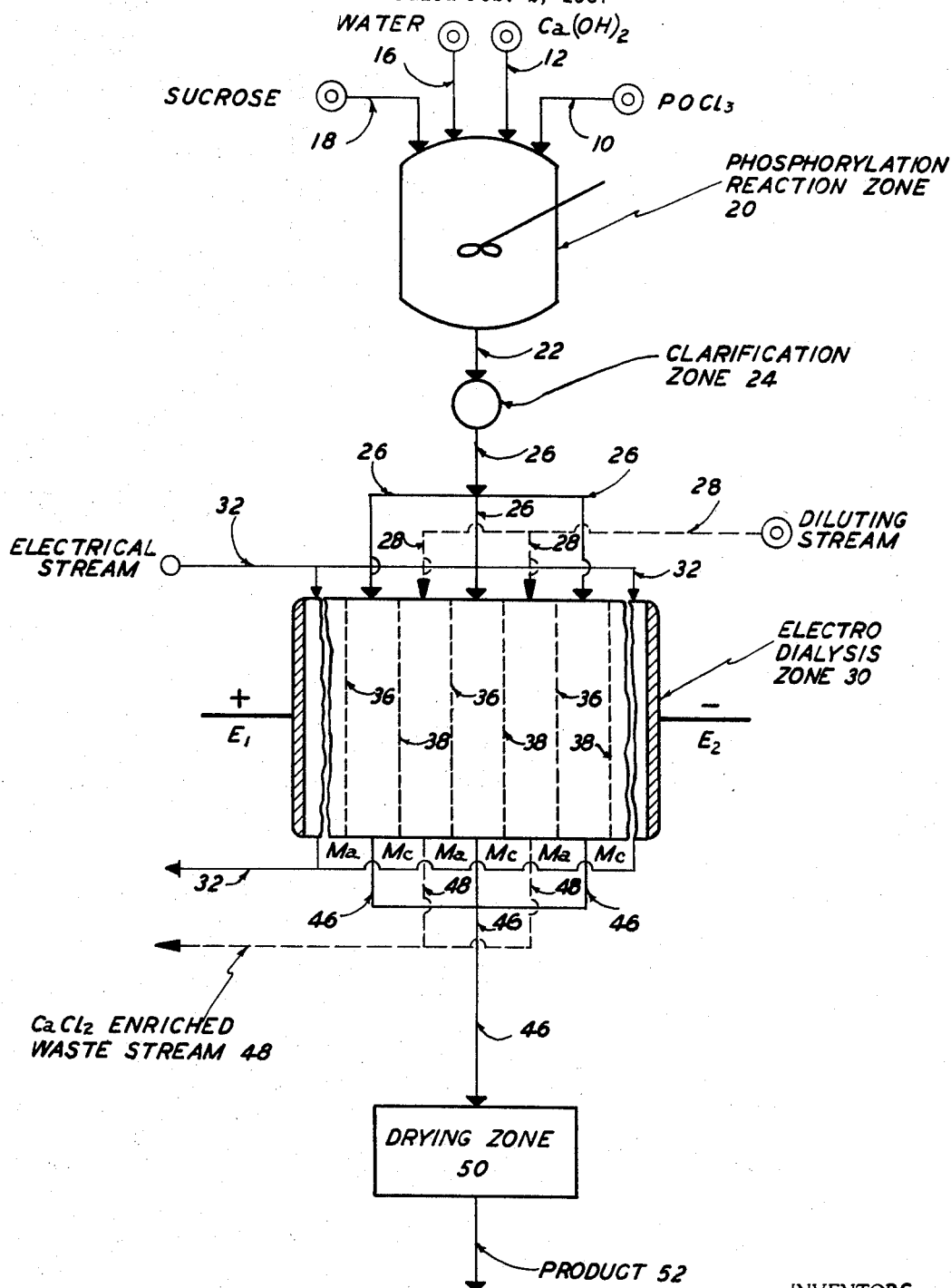

3,472,750
ELECTRODIALYSIS OF SUGAR PHOSPHORYLATION REACTION SOLUTIONS
Ramsey G. Campbell, Berkeley, and Charles C. Oldenburg, Mill Valley, Calif., assignors, by mesne assignments, to The Colonial Sugar Refining Company Limited, Sydney, New South Wales, Australia, a corporation of New South Wales
Filed Feb. 2, 1967, Ser. No. 613,631
Int. Cl. B01k 5/00; B01d 13/02
U.S. Cl. 204—180  10 Claims

ABSTRACT OF THE DISCLOSURE

A method of selectively separating calcium chloride from an electrically conductive solution containing a calcium sugar phosphate, inorganic calcium phosphates, and calcium chlorides by (1) maintaining the solution in an electrodialysis zone, (2) impressing a D.C. voltage of suitable magnitude across the zone to cause anions to be transported through a first boundary of the zone which excludes cations and to cause cations to be transported through a second boundary of the zone which excludes anions whereby $CaCl_2$ is substantially separated from the solution and (3) recovering a solution essentially containing the phosphates and depleted in $CaCl_2$.

---

Calcium sucrose phosphate and complex mixtures thereof with inorganic calcium phosphates have been found to be useful in the prevention of dental caries, as plant and animal nutrients, as coatings for breakfast cereals, and are believed to have wide application in a variety of fields. It is known from German Patent 247,809 that simple calcium sucrose phosphate can be produced by the phosphorylation of sucrose in the presence of lime. That patent sets forth the known method of separating the resulting calcium chloride from the calcium sucrose phosphate containing reaction product, namely, via ethanol precipitation and a series of washes. Complex calcium sucrose phosphate and inorganic calcium phosphates are disclosed in copending application Serial No. 414,074, now Patent No. 3,375,168, together with several novel methods of making the complex. The method of separating the calcium chloride which, if allowed to remain in the final product causes the same to deliquesce and become liquid upon exposure to atmospheric moisture, disclosed in copending application, Serial No. 414,074, now Pat. No. 3,375,168, is essentially the same as disclosed in the German patent. While separation of calcium chloride employing ethanol precipitation and a series of washes works quite satisfactorily, it is unfortunately inefficient and economically impracticable on a commercial scale. It is therefore the principal object of the present invention to overcome and eliminate the deficiencies inherent in the known methods for the separation of calcium chloride from mixtures thereof with calcium sucrose phosphate and inorganic calcium phosphate.

Another object of the present invention is to provide an economically attractive process for recovering calcium sucrose phosphate containing product essentially free of hygroscopic substances such as calcium chloride.

Another object of the present invention is to separate calcium chloride from the product of reaction of the phosphorylation of a sugar in the presence of calcium oxy-compounds such as lime.

Another object of the present invention is to provide a process for the separation of calcium chloride from a solution containing calcium chloride as well as calcium sucrose phosphate, an inorganic calcium phosphate, and sucrose in a selective manner such that the relative amount of phosphate removed from the product is minimized.

Other objects and advantages will become apparent to those skilled in the art from the following description and disclosure.

These and other objects are generally accomplished in accordance with the process of the present invention by maintaining an electrically conductive solution containing as essential constituents thereof, calcium sucrose phosphate, inorganic calcium phosphate and calcium chloride in an electrodialysis zone, impressing a D.C. voltage of suitable magnitude across the electrodialysis zone to cause anions to be transported through a first boundary of the zone which excludes cations and to cause cations to be transported through a second boundary which excludes anions. It has been discovered in the practice of the present invention employing solutions produced in the phosphorylation of sucrose, quite unexpectedly and surprisingly, that calcium chloride can be separated on a highly selective basis from the inorganic as well as organic phosphates in the solution. Calcium chloride removal greater than 99% by weight has been achieved by electrodialysis while experiencing a surprisingly small percentage loss of total phosphorus product, i.e., less than about 2%, the inorganic phosphorus loss being less than about 0.5%. It is surprising that chloride can be selectively separated from a solution containing anionic species including sucrose phosphate anions, inorganic phosphate anions, as well as chloride anions, by electrodialysis. It is further surprising and contrary to what might have been predicted that the major proportion of the loss is accounted for by the relatively large sucrose phosphate anion rather than the inorganic phosphate anion.

The separation method of the present invention finds a preferred application in the separation of undesirable $CaCl_2$ from the reaction effluent of a zone wherein sucrose or other sugar is phosphorylated, e.g., with $POCl_3$, in the presence of a calcium oxy-compound, e.g., CaO, $Ca(OH)_2$, and calcium carbonate at low temperatures, e.g., between about 0° and 20° C. as is more fully hereinafter described with reference to the figure of the drawing and in the examples. It is to be understood, however, that any suitably electrically conductive solution containing the essential constituents hereinbefore defined can be separated by the process of the present invention. Methods of determining electrical conductivity of solution are well known in the art and further explanation is not required herein. It is known that the electrical conductivity of a solution decreases with the concentration of ionic species therein and that very dilute solutions will not readily be separated by this method. The limits of applicability can readily by determined in any given situation by one skilled in the art.

The aforementioned first and second boundaries of the electrodialysis zone are formed by suitable electrodialysis membranes. Suitable cation—as well as anion—exchange membranes capable of transporting cations and anions, respectively, while excluding the alternative species are well known in the art. Suitable cation-exchange membranes are described in U.S. Patent 2,731,411 while suitable anion exchange membranes are described in U.S. Patent 2,860,076 as well as in 2,860,097.

The magnitude of the D.C. voltage required to effect separation must be determined for the particular apparatus and solutions employed. The term D.C. voltage employed herein refers to a voltage causing unidirectional, non-alternating flow of current. The D.C. voltage can be applied continuously although an intermittent or pulsed application is preferred to prevent local concentration of the electrically conductive solutions at or near the membranes and electrodes.

Reference is now made to the figure of the drawing, which shows diagrammatically, in elevation, one preferred embodiment to provide a better understanding of the process of the present invention.

Referring to the drawing, a calcium sucrose phosphate containing material is prepared in phosphorylation reaction zone 20 by the introduction of suitable quantities of sucrose via line 18, water via line 16, and a calcium oxy-compound selected from the group consisting of calcium hydroxide, calcium oxide and calcium carbonate in line 12, and thereafter slowly introducing phosphorus oxychloride ($POCl_3$) via line 10 while agitating the reaction mixture in zone 20. The phosphorylation reaction zone is preferably maintained at a temperature between about 0° and about 20° C. by the application of suitable cooling means. The reaction can be carried out in a batch or continuous manner and the phosphorus oxychloride can be introduced either by itself as set forth in the copending application of Campbell et al. filed herewith, or in solution of a chlorinated hydrocarbon solvent such as trichloroethylene or chloroform. As disclosed in copending application Serial No. 262,230 filed Mar. 1, 1963, now abandoned, the ratio of sugar to calcium oxy-compound to phosphorus oxy-chloride is preferably stoichiometric. When the reaction in zone 20 has been carried out to the desired degree, a turbid reaction solution is obtained containing calcium sucrose phosphate, inorganic calcium phosphate and unreacted surcose in water. The reaction liquor is passed in line 22 to a suitable clarification zone 24. Satisfactory clarification has been obtained using a centrifugal clarifier operated at 24,000 r.m.s. as set forth in the above identified application filed herewith. Clarified reaction liquor is passed via line 26 to alternate passages formed by the membranes disposed in parallel flow relationship in respect to the liquor in zone 30 for separation of the calcium chloride in accordance with the present invention.

Electrodialysis zone 30 is a schematic representation of such a zone operating on a concentrating-diluting principle hereinafter described, $E_1$ and $E_2$ represent suitable electrodes and line 32 represents electrically conductive streams flowing through passages adjacent to the electrodes. Line 28 represents electrically conductive streams, e.g., containing an aqueous solution of $CaCl_2$ flowing through alternate passages formed by the membranes. The numeral 36 and designation $Ma$ represent anion-exchange membranes while the numeral 38 and designation $Mc$ represent cation-exchange membranes, which, in practice, are separated from each other by suitable spacer means (not shown). In operation, streams 26, 28 and 32 are flowed through their respective passages in zone 30 while a D.C. voltage is impressed between $E_1$ and $E_2$ causing current flow in the electrically conductive solutions flowing therebetween. Positive ions, e.g., $Ca^{++}$ are caused to pass from the diluting streams 26 through membranes 38 into concentrating streams 28 from which their further travel toward the cathode, $E_2$, is blocked by the adjacent anion membranes 36. Negative ions, e.g., $Cl^-$, pass from the diluting streams 26 through the anion membranes 36 into the concentrating streams and can travel no further. The concentrating stream enriched, e.g., in $CaCl_2$, is withdrawn to waste in line 48 while a phosphate containing product liquor is withdrawn in line 46. It is to be understood that zone 30 can be operating in a batch or continuous manner and alternatively, with recycle of product withdrawn in line 46 to line 26.

Zone 50 represents suitable drying means, e.g., a spray dryer, in which a dried, free flowing product is produced from liquor introduced via line 46, product is withdrawn in line 52.

EXAMPLE 1

Preparation of phosphorylation reaction liquor

Liquors containing essentially calcium sucrose phosphate, inorganic calcium phosphate and calcium chloride employed in the following examples were prepared in the following manner. A 30-gallon stainless steel baffled reactor equipped with a suitable stirrer and immersed in a drum of isopropanol Dry Ice was employed as the reaction zone. Refined sucrose in the amount of 42.29 lbs. was dissolved in 21.31 lbs. water. Next 104.02 lbs. tap water and 22.42 lbs. calcium hydroxide were charged to the reactor and the slurry agitated at room temperature. After about 15 minutes the sucrose solution was charged into the reactor with a temperature rise to 8° C. The mixture was cooled to 5° C. with an external isopropanol Dry Ice bath. Phosphorus oxychloride in the amount of 19.41 lbs. was charged slowly to the reactor at a temperature of 3–5° C. The $POCl_3$ addition was stopped when the pH of the mixture reached 9.0. When the $POCl_3$ addition was complete agitation was continued for about one half hour at a temperature of 3–5° C. At the end of this time the pH had fallen to 7.5. Next agitation was stopped and the reactor contents warmed to room temperature overnight. The crude reaction mass was clarified by passing it through a laboratory Sharples Super Centrifugal clarifier about 3.04 lbs. of slime was removed. The composition of typical clarified reaction mass is set forth below in Table I.

Table I.—Typical composition of clarified reaction solution

[Source: Crude anticay made in cylindrical reactor]

| | | |
|---|---|---|
| Ca | percent | 5.69 |
| C | do | 6.16 |
| P total | do | 1.830 |
| P inorganic | do | 0.393 |
| P organic | do | 1.437 |
| Sucrose | do | 7.0 |
| Total solids | do | 37 |
| Density | g./ml | 1.25 |
| Viscosity at 20° C. | cp | 14 |

EXAMPLE 2

Electrodialysis of phosphorylation reaction solution

The following example is carried out employing feed liquor to an electrodialysis zone of the type represented in the figure of the drawing prepared as set forth in Example 1. The properties of the feed liquor, measured prior to electrodialysis, are set forth, below, in Table 2. The feed liquor contains essentially calcium sucrose phosphate, an inorganic calcium phosphate, calcium-chloride and sucrose.

Table 2.—Electrodialysis feed liquor

| Property | Measurement |
|---|---|
| Density | 1.2506 g./ml. at 69° F. |
| Viscosity | 7.88 centistokes at 67° F. |
| Chloride Analysis | 2.34 normal chloride ion=10.4 wt. percent $CaCl_2$. |
| Conductivity | 12.5 ohm-cm. at 70° F. (0.1 scale). |
| Conductivity | 10.0 ohm-cm. at 105° F. (0.1 scale). |
| Conductivity | 15.0 ohm-cm. at 70° F. (0.01 scale). |

The electrodialysis apparatus consists of a stack containing ten units, each unit consisting of one cationic and one anionic membrane separated by a spacer. The effective area of a unit is about 2.3 ft.² The spacer thickness is about 0.040 inch. The stack, membrane, and flow arrangement is essentially as schematically represented in the figure of the drawing, except that a greater number of cell units are employed as specified in this example. The cation membrane is a sulfonated polystyrene membrane such as is described in U.S. Patent 2,731,411. The membrane thickness is 24 mils (0.6 mm.). The specific membrane employed in the example is available under the name "Nepton" 61CZL Dynel-backed cation-exchange membrane (Ionics, Inc.). The anion membrane comprises a copolymer combining a thermohydrolytically stable ionic group with water solvatable skeletal structure containing quaternary N-alkyl N-heterocyclic groups such as described in U.S. Patent 2,860,096. The membrane thickness is about 30 mils (0.75 mm.). The specific membrane employed in this example is available under the name "Nepton" 111EZL anion-exchange membrane (Ionics, Inc.). The anode is made of platinized tantalum, e.g., Tirreloy-B, and the cathode is made of Hastelloy-C. In this example, 1.5 liters of the electrodialysis feed liquor shown in Table 2 is flowed through the electrodialysis zone, e.g., in line 26 at an essentially constant rate over a period of 103 minutes. The diluting stream, e.g., in line 28, is 6 liters of 5% by weight aqueous solution of $CaCl_2$. The electrode stream, e.g., in line 32 is a 1% by weight aqueous solution of $CaCl_2$ (6 liters pH about 2). The direct current varies from an initial reading of 13.5 amps (time=0) to a reading of 0.90 amp (time=103 minutes). The decrease in current is gradual, selected intermediate reading being as follows: 10.5 amps at 10 min.; 9.1 amps at 40 min.; 6.2 amps at 70 min.; 2.8 amps at 90 min.; 1.3 amps at 100 min. The D.C. voltage (10 c.p.) varies from about 15 volts, initially, to 9.8 volts at the end of the run. The temperature of the feed liquor is maintained between 99 and 114° F. Pressure drop is 25 p.s.i. and product flow rate is 800 ml./min.

The analytical results of this run indicate that $CaCl_2$ removal is 99.5%; total phosphorus loss is 0.9 to 1.6%; inorganic phosphorus loss is 0.3 to 0.4%; and sucrose removal is 6.6 to 9.9%.

The analytical results of the dried product run are set forth in Table 3, below:

Table 3

| Component: | Weight percent (dry basis) |
|---|---|
| Calcium | 8.86 |
| Phosphorus (total) | 7.09 |
| Phorphorus (inorganic) | 1.82 |
| Chloride | 0.239 |
| Sugar | 22.0 |

Having thus described the invention with reference to specific examples thereof, many modifications and alterations will become apparent to those skilled in the art without departing from the scope thereof. Calcium sugar phosphates in addition to that derived from sucrose which are representative of those included within the scope of the method of the present invention are those derived from materials such as galactose, arabinose, ribose, xylose, maltose, lactose, raffinose and glucose.

What is claimed is:

1. A method of selectively separating calcium chloride from an electrically conductive solution containing essentially a calcium sugar phosphate, inorganic calcium phosphates and calcium chloride which comprises maintaining such a solution in an electrodialysis zone, impressing a D.C. voltage of suitable magnitude across said zone to cause anions to be transported through a first boundary of said zone which excludes cations and to cause cations to be transported through a second boundary of said zone which excludes anions whereby $CaCl_2$ is substantially separated from said phosphates contained in said solution, and recovering a solution essentially containing said phosphates and depleted in calcium chloride.

2. The method of claim 1 in which said calcium sugar phosphate comprises calcium sucrose phosphate.

3. The method of claim 1 in which said calcium sugar phosphate is derived from a sugar selected from the group consisting of sucrose, galactose, arabinose, ribose, xylose, maltose, lactose, raffinose and glucose.

4. The method of claim 1 in which suitably electrically conductive solutions are maintained adjacent to said first and second boundaries to receive said anions and cations transported therethrough.

5. The method of claim 1 in which said D.C. voltage is pulsed.

6. A process which comprises phosphorylating a sugar in the presence of a suitable calcium oxy-compound to produce an electrically conductive solution containing a calcium sugar phosphate, inorganic calcium phosphate, unreacted sugar, and calcium chloride, flowing said solution through an electrodialysis zone to selectively separate calcium chloride from said phosphates, and recovering the resulting phosphates containing solution depleted in calcium chloride from said electrodiaylsis zone.

7. The process of claim 6 in which said calcium sugar phosphate comprises calcium sucrose phosphate.

8. The process of claim 6 in which said electrodialysis zone comprises a plurality of alternately arranged cation-exchange membranes and anion-exchange membranes disposed in parallel flow relationship with said solution containing said phosphates, to provide a plurality of adjacent parallel flow passages, flowing the solution containing said phosphates through alternate passages while flowing a second electrically conductive aqueous solution through the remaining alternate passages to receive anions and cations from said solution containing said phosphates, withdrawing said second solution enriched in calcium or chloride and recovering the solution containing said phosphates not substantially diminished in said phosphates and substantially depleted in calcium chloride.

9. A process which comprises reacting material consisting essentially of $POCl_3$, a sucrose, and a calcium oxy-compound selected from the group consisting of calcium oxide, calcium hydroxide and calcium carbonate in essentially stoichiometric proportions at a temperature between about 0° C. and about 20° C. under conditions to produce a solution containing calcium sucrose phosphate, an inorganic phosphate, unreacted sucrose and calcium chloride, separating calcium chloride from said solution in an electrodialysis zone, and recovering dried, free flowing, solid product essentially free of calcium chloride and containing said phosphates as the product of the process.

10. The product of the process of claim 8.

References Cited

UNITED STATES PATENTS

| 1,972,561 | 9/1934 | Heubaum | 204—1 |
| 2,860,091 | 11/1958 | Rosenberg | 204—138 |
| 3,290,173 | 12/1966 | Marino | 127—63 |

JOHN H. MACK, Primary Examiner

A. C. PRESCOTT, Assistant Examiner

U.S. Cl. X.R.

127—53